N. B. GOCKLEY.
AUTOMOBILE HEADLIGHT ADJUSTER.
APPLICATION FILED JULY 14, 1910.

983,991.  Patented Feb. 14, 1911.

WITNESSES
B. P. Faltin
M. L. Lefevre

INVENTOR
Noah B. Gockley
BY
John J. Thompson
ATTORNEY

UNITED STATES PATENT OFFICE.

NOAH B. GOCKLEY, OF EPHRATA, PENNSYLVANIA.

AUTOMOBILE HEADLIGHT-ADJUSTER.

983,991.

Specification of Letters Patent.   Patented Feb. 14, 1911.

Application filed July 14, 1910.   Serial No. 571,916.

*To all whom it may concern:*

Be it known that I, NOAH B. GOCKLEY, a citizen of the United States, residing at Ephrata, in the county of Lancaster and State of Pennsylvania, have invented certain new and useful Improvements in Automobile Headlight-Adjusters, of which the following is a specification, reference being had therein to the accompanying drawing.

This invention relates to a device or attachment for automatically operating the headlights of automobiles by the action of the steering gear in such a manner that the curves of the road may be illuminated as the course of the vehicle is changed.

The object of my invention is to produce an apparatus that is simple of construction, durable, and easy of attachment to the different makes of automobiles.

Another object being in a device of this class to provide means whereby the vertical movement of the body in relation to the running gear is compensated for and will not affect the movement of the lamps.

With these and other objects in view my invention consists in certain construction and combination of parts as will hereinafter be fully described and claimed and illustrated in the accompanying drawings which form a part of this application, and in which like figures of reference refer to corresponding parts in all of the views; but it is fully understood that while I have here described my invention as shown that I do not confine myself to the exact design as shown, as slight changes may be made in the construction and arrangement of the several parts without departing from the spirit of the invention.

Figure 1:
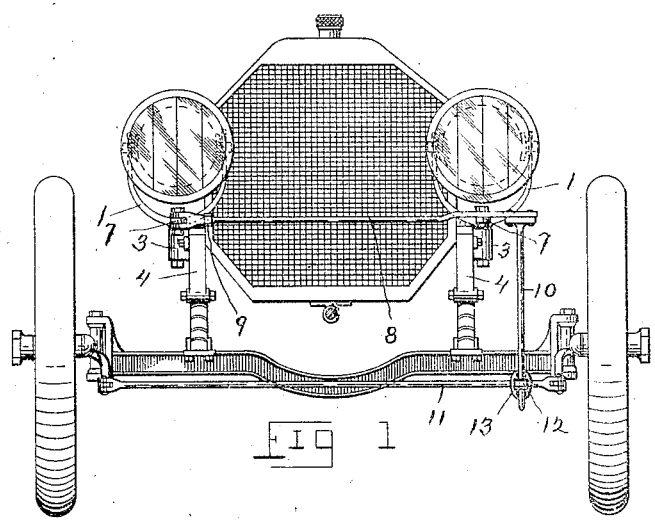
Figure 2:
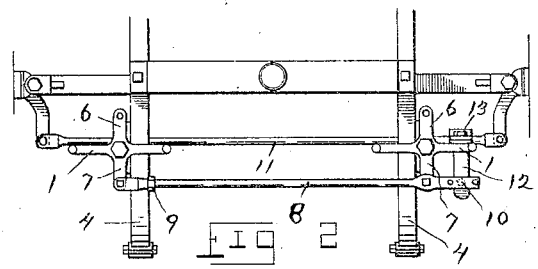
Figure 3:
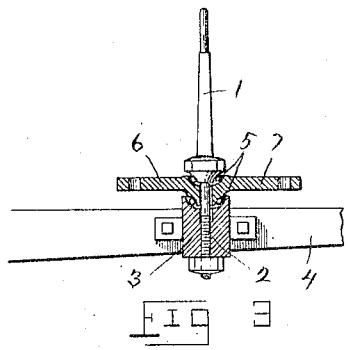
Figure 4:
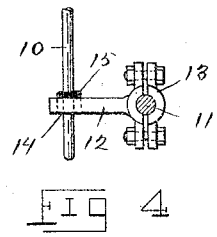

Referring to the drawings:—Figure 1, is a front elevation of an automobile provided with my improved apparatus. Fig. 2, is a top plan view of the apparatus as applied to an automobile. Fig. 3, is a vertical sectional elevation of one of the lamp brackets. Fig. 4, is a detail view of the steering rod clamp and the vertical movement compensating device.

Referring to the drawings, the apparatus or attachment comprises the lamp forks 1, which are provided with the pivot stems 2, journaled in the bearings 3, which are secured to the side frames 4, of the car; said stems 2, also being provided with the ball bearings 5. The lamp forks 1, are further provided with the rearwardly extending arms 6, and the forwardly extending arms 7; making it adaptable to use either pair in connecting up the device as may be found most suitable, and here being shown with the forward pair in use.

To the ends of the arms 7, is pivoted a connecting rod 8, which is supplied with an adjusting nut or turnbuckle 9, near one end thereof; while the opposite end is extended beyond the pivot point and has attached thereto a vertical compensating rod 10.

To the steering rod 11, of the automobile is secured an arm 12, by the clamp 13; said arm 12, being formed with a vertical orifice 14; within which is held a rubber or leather bushing or collar 15, through which extends the lower end of the compensating vertical rod 10. Said compensating rod 10, is of sufficient length to prevent its jumping out of said bushing and yet compensates for all of the vertical motion of the body of the vehicle with reference to the running gear. In this way it will be readily seen that the slightest lateral movement of the steering rod 11, will move the rod 10, and reciprocate the connecting rod 8, and thus turn the lamps on their pivot mountings.

Having thus described my invention what I claim as new and desire to secure by Letters Patent is: —

1. In a device of the class described, in combination with lamp forks pivoted to the car, of arms secured to and projecting from the base of said lamp forks, both forwardly and rearwardly at right angles thereto, an adjustable connecting rod pivoted upon the ends of said arms, and having one of its ends extending beyond said pivot point, a combined actuating and compensating rod secured upon one end of said connecting rod and extending downwardly at right angles thereto, and an arm secured to the steering rod of the vehicle and having said compensating rod slidably mounted therein.

2. In a swivel headlight apparatus for vehicles, comprising in combination with a pair of lamp forks formed with depending spindles pivotally mounted upon said vehicle, of actuating arms extending from said spindles at right angles thereto, a connecting rod joining said actuating arms and having one of its ends extending beyond one of said arms; a compensating rod extending downward from said connecting rod and an arm secured to the steering rod of said vehicle, and formed with a vertical orifice in the body thereof for the reception of said compensating rod allowing said rod to have a free vertical movement and preventing any lateral movement of said rod.

In testimony whereof I affix my signature in presence of two witnesses.

NOAH B. GOCKLEY.

Witnesses:
WM. J. COULTER,
JOHN J. THOMPSON.